(12) United States Patent
Wang et al.

(10) Patent No.: US 10,445,078 B2
(45) Date of Patent: Oct. 15, 2019

(54) LAYERED SOFTWARE ARCHITECTURE MODEL FOR TRANSLATION OF ASSEMBLER LANGUAGE TO TARGET LANGUAGE

(71) Applicants: Jian Wang, Sterling, VA (US);
Zhenqiang Yu, Rockville, MD (US);
Yan Cheng, Great Falls, VA (US)

(72) Inventors: Jian Wang, Sterling, VA (US);
Zhenqiang Yu, Rockville, MD (US);
Yan Cheng, Great Falls, VA (US)

(73) Assignee: Internal Revenue Service United States Department of the Treasury

(*) Notice: Subject to any disclaimer, the term of this patent is extended or adjusted under 35 U.S.C. 154(b) by 366 days.

(21) Appl. No.: 15/582,619

(22) Filed: Apr. 29, 2017

(65) Prior Publication Data

US 2018/0314505 A1 Nov. 1, 2018

(51) Int. Cl.
*G06F 9/455* (2018.01)
*G06F 8/41* (2018.01)

(52) U.S. Cl.
CPC .............. *G06F 8/447* (2013.01); *G06F 8/433* (2013.01); *G06F 9/45516* (2013.01)

(58) Field of Classification Search
None
See application file for complete search history.

(56) References Cited

U.S. PATENT DOCUMENTS

2018/0253287 A1* 9/2018 Wang .................. G06F 8/24
2018/0314497 A1* 11/2018 Wang .................. G06F 8/51

* cited by examiner

*Primary Examiner* — Kenny S Lin

(57) ABSTRACT

The present invention is a multi-layer computer architecture which separately extracts ALC business and logical functions and data. The architecture creates a Java object model or other target language object model which allows comparison of ALC data with target language data to verify logical processes. These object models can be directly traced back to the legacy ALC. The data model is automatically generated from a scan of the ALC and leverages generic patterns which can be reused to generate Java representations of other legacy code bases.

33 Claims, 28 Drawing Sheets

Figure 1 - Prior Art

- First time through process – NOP instruction modified by MVI

```
CMBTGET    NOP    ENDPROC
           MVI    CMBTGET+1,X'F0'
```

- String length being modified
```
STC        R15,MOVSM+1
MOVSM MVC  0(1,R1),0(R14)
```

- Operand value being modified – MVI instruction is modifying the opcode of the CLI instruction with 'Y'
```
           LTR    R1,R1
           BZ     BALMSG
           MVI    BALMSG+1,C'Y'
BALMSG     CLI    0(R2),C'X'
```

- Branch conditions modified at run time
```
BALMSG     BC     0,TARGET
           OI     BALMSG+1,X'F0'
```

- Operand offset (displacement) modified
```
           SR     R3,R4
           A      R3,=X'000009000'
           STH    R3,BALMSG+4
BALMSG     MVC    RESULT,OFFSET(R9)
```

Figure 6

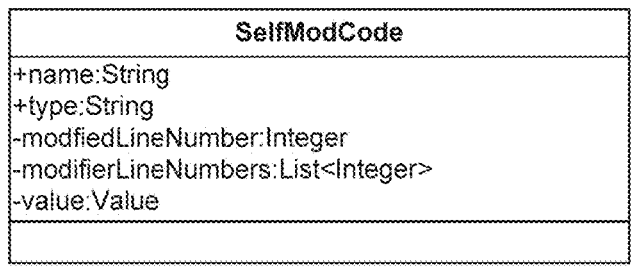

| Name: | The label of instruction being modified. When the label is not present, a system generated label with statement number for that instruction is used. |
|---|---|
| Type: | The data type for the modified value. It can be Boolean type for a gate, String for the operand of character value or Integer type for the operand length to be modified etc. |
| ModifiedLineNumber: | The line number where the modified instruction resides. |
| ModifierLineNUmbers: | A list of line numbers where the modifying instructions reside. |
| value: | The runtime value of modification. |

Figure 7

```
001C38  0000000000000000          1552+         DC      001C40
0000000000000000
001C48  00000000                  1553+         DC      A(0)
0020C8                            1692+IHB0095A DS      0H
```

| Symbol | Length | Value | Id | R | Type | Asm | Program | Defn | References | | | | | HLASM |
|---|---|---|---|---|---|---|---|---|---|---|---|---|---|---|
| R6.0 2015/03/27 16.20 | | | | | | | | | | | | | | |
| CLOSEDEL | 4 | 0000179A | 00000001 | | I | | | 1034 | 547M | 1025B | | | | |
| AR2RLOPA | 4 | 000018F4 | 00000001 | | I | | | 1182 | 1206B | | | | | |
| AR2RLOPN | 4 | 00001892 | 00000001 | | I | | | 1149 | 1175B | | | | | |
| BADCARD | 4 | 0000051E | 00000001 | | I | | | 496 | 523B | 525B | 527B | 529B | 531B | 533B | 545B |
| BDELUP | 4 | 00000320 | 00000001 | | I | | | 331 | 310B | | | | | |
| BEGMAIN | 4 | 0000017A | 00000001 | | I | | | 195 | 145B | | | | | |
| BRSQUP | 4 | 0000036A | 00000001 | | I | | | 354 | 298B | 302B | 307B | 321B | | |
| BTCKUP | 4 | 000003A2 | 00000001 | | I | | | 373 | 297B | 301B | 306B | 312B | 315B | |

Figure 11

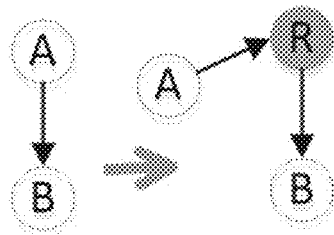
Figure 21: Loop Redirects
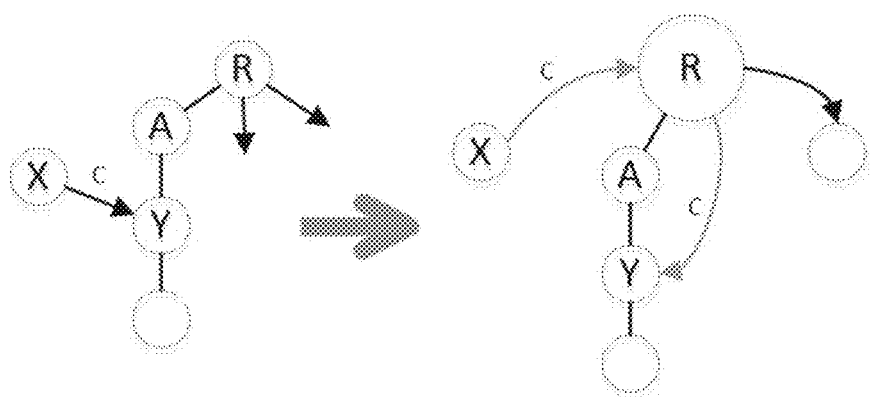
Figure 22: Handle Branch-Ins
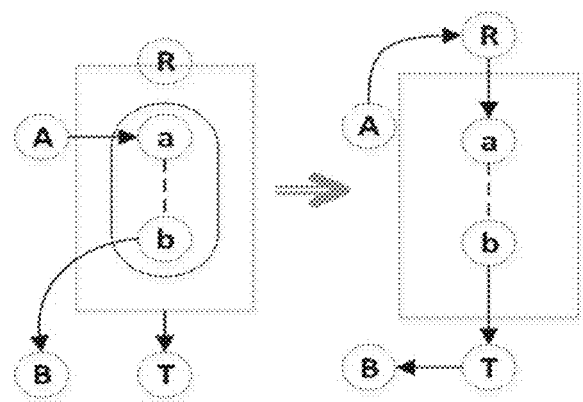
Figure 23: Handle Branch-Outs

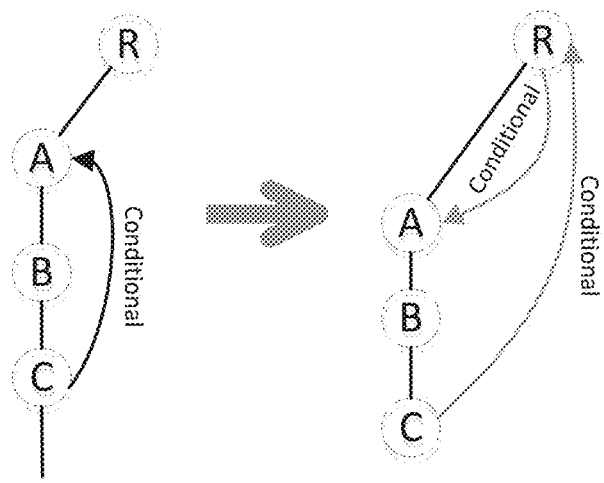
Figure 24: Handle Branch-Ups
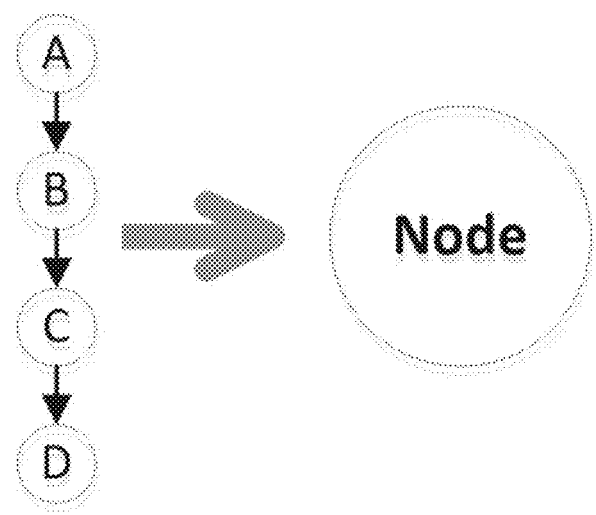
Figure 25: Detection and Transformation of Sequences

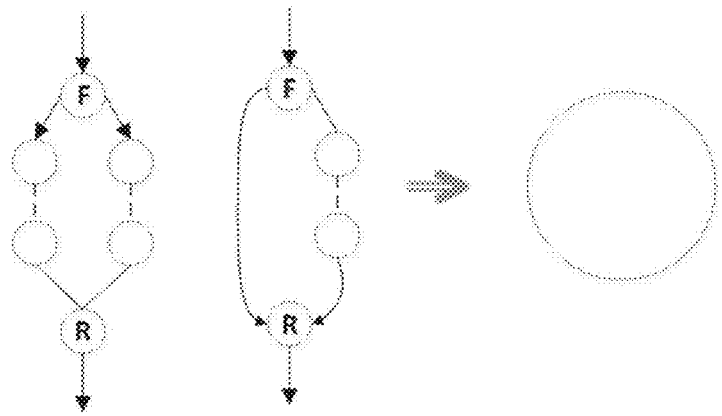
Figure 26: Detection and Transformation of Switches
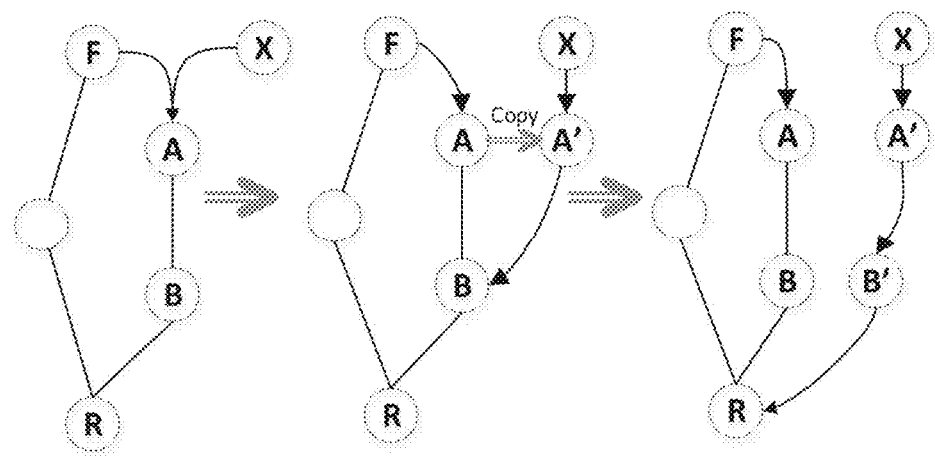
Figure 27: Pattern Disruption

| Offset(h) | 00 | 04 | 08 | 0C | |
|---|---|---|---|---|---|
| 00000000 | 00580000 | 00000040 | 000109C5 | 07C982E3 | ← |
| 00000010 | C5D9E240 | 00007DC4 | 0003F840 | 00000064 | Registers |
| 00000020 | 00000DF9 | 0000793A | 00000000 | 000239F4A | |
| 00000030 | 00000000 | 00008340 | 0000A340 | 009C7CA8 | ← |
| 00000040 | 00008340 | 00009340 | 0000D340 | 06FEBC88 | |
| 00000050 | 00007340 | 400073D2 | 7FE80000 | 00008FC4 | |
| 00000060 | 0001C9F4 | F6F0F1F3 | C5404040 | 00007340 | |
| 00000070 | 47F0F066 | 00006F60 | 00000000 | 50088FB8 | ← |
| 00000080 | 1AD6160C | 0007DE4E | 00CFFA88 | 0007E044 | |
| 00000090 | 0007DEC0 | 0007E044 | 00000000 | 0007DEC0 | |
| 000000A0 | 00000000 | 0007DA48 | 0000A340 | 009C7CA8 | |
| 000000B0 | 50088FB8 | 00CFF480 | C182E2C5 | D4C2D3C5 | |
| 000000C0 | C440F2F0 | F1F4F1F2 | F1F14040 | E3C9D4C5 | |
| 000000D0 | 40F1F14B | F0F790EC | D00C50D0 | F00450F0 | |
| 000000E0 | D00818DF | 989BD0A8 | 50108288 | 5860D0D0 | Instruction |
| 000000F0 | 45206516 | 47F0D08C | 0003F840 | 59F0D088 | /data |
| 00000100 | 05EF5860 | D0C44D20 | 60005860 | D0CDA7F0 | |
| 00000110 | 60000000 | 00007340 | 00008340 | 00009340 | |
| 00000120 | 0000D340 | 0000A340 | 0000B340 | 0000C340 | |
| 00000130 | 0000E340 | 0000F340 | 00010340 | 00011340 | |
| 00000140 | 00012340 | 00013340 | 00014340 | 00015340 | |
| 00000150 | 00016340 | 9012014C | 020100FC | 2002D201 | |
| 00000160 | D1402000 | 5820B1C8 | D204D154 | 0000DD00 | |
| 00000170 | D158D15F | 4770D116 | 920D15E | F154D159 | |
| 00000180 | D15447F0 | D13ED205 | D159D154 | 4220D15D | |
| 00000190 | 95F0D15D | 4770D12C | 9200D15D | 920DD15E | ← |
| 000001A0 | F154D159 | D1595810 | D14C5820 | B1C8D205 | |
| 000001B0 | 0000D159 | 5820D150 | 47F02004 | 00000000 | |
| 000001C0 | 00000000 | 00000000 | 00000000 | 00000000 | |
| 000001D0 | 00000000 | 00000000 | 00AA0506 | 07080900 | ← |
| 000001E0 | 00000000 | 00000000 | 00AA1516 | 17181900 | Dynamic |
| 000001F0 | 00000000 | 00000000 | 00AA2526 | 27282900 | memory |
| 00000200 | 00000000 | 00000000 | 00AA3536 | 37383900 | ← |

Figure 31

LAYERED SOFTWARE ARCHITECTURE MODEL FOR TRANSLATION OF ASSEMBLER LANGUAGE TO TARGET LANGUAGE

STATEMENT REGARDING FEDERALLY SPONSORED RESEARCH OR DEVELOPMENT

The invention described herein was made by an employee of the United States Government and may be manufactured and used by the Government of the United States of America for governmental purposes without the payment of any royalties thereon or therefore.

CROSS-REFERENCE TO RELATED APPLICATIONS

This patent application claims the benefit of U.S. Provisional Applications Nos. 62/445,603 filed Jan. 12, 2017 and 62/445,188 filed Jan. 11, 2017. The above applications are incorporated by reference herein in their entirety.

FIELD OF INVENTION

This invention relates to the field of programming languages and more specifically to a method for translating assembler code languages.

BACKGROUND OF THE INVENTION

The Internal Revenue Service currently has two U.S. co-pending patent Applications entitled "Translation of Assembler Code Using Intermediary Technical Rules Language (TRL)" and "Method for Translation of Assembler to Valid Object Oriented Programming Language."

These co-pending patent applications teach various methods and structures for translating legacy assembler computer language to an object-oriented target language using an intermediary Technical Rules Language (TRL).

IRS currently has a large inventory of legacy applications written in IBM. Recently, the IRS Enterprise Services (ES) team has developed ALC-to-Java translation tools to support the migration of the IRS Individual Master File (IMF) ALC applications to Java.

There are many challenges in translation from a machine/low-level programming language, such as ALC, to a high-level programming language like Java. Fundamentally, the coding conventions used in ALC are very difficult to grasp by developers who are trained in modern coding practices.

FIG. 1 illustrates a complex ALC control flow example. As illustrated in FIG. 1, ALC is characterized by complexities such as lack of basic conditional logic (if-then-else/loops). This emanates from non-standard subroutine linkage reflecting that some of the code was written in 1968 when no coding standards existed. ALC exhibits widespread. These and other complexities result in numerous challenges in the translation from the source language of ALC to the target language of Java.

There is an unmet need for a multi-layer computer architecture which can create ALC to Java Object Models (JOMs) capable of being directly traced back to the legacy ALC.

There is a further unmet need for a computer architecture with configured rule sets that can be reused to generate Java representations of other legacy code bases.

BRIEF SUMMARY OF THE INVENTION

The present invention is computer architecture for translating ALC to Java. The layered data model to ultimately represent IMF data structures in a Java Object Model (JOM). These data structures can be traced back to the legacy ALC. An ALC program is executed in a mainframe environment while the TRL program is executed in Java Runtime Environment (JRE).

At a selected break point, instrumented ALC code can dump the mainframe program memory to flat file(s). The mainframe memory dump file is then transferred to the Java environment. The TRL engine can load the memory dump from the file, convert the physical memory dump to TRL data memory buffers and variable values, and then execute the TRL program.

At another selected break point, ALC code can create a second memory dump, to be compared to the TRL program execution result at the same break point.

One Model includes a physical Layer which simulates the ALC physical memory structures. A two-layer data model performs Analyzer functions on ALC program files to detect code. ALC to TRL Translator Tool generates TRL files, detects translation errors and updates itself until no errors are detected.

Data structures are extracted from ALC code and converted to Java Object Models (JOM). JOMs can be directly traced back to the legacy ALC.

BRIEF DESCRIPTION OF SEVERAL VIEWS OF THE DRAWINGS

FIG. 6 illustrates exemplary self-modifying code in ALC.

FIG. 7 illustrates exemplary data structures used for translation of self-modifying code.

FIG. 11 is an exemplary extraction log.

FIGS. 21 through 27 illustrate the transformation of various subroutines to CFG representations.

FIG. 31 illustrates an exemplary memory dump file organization.

TERMS OF ART

Figure 1:
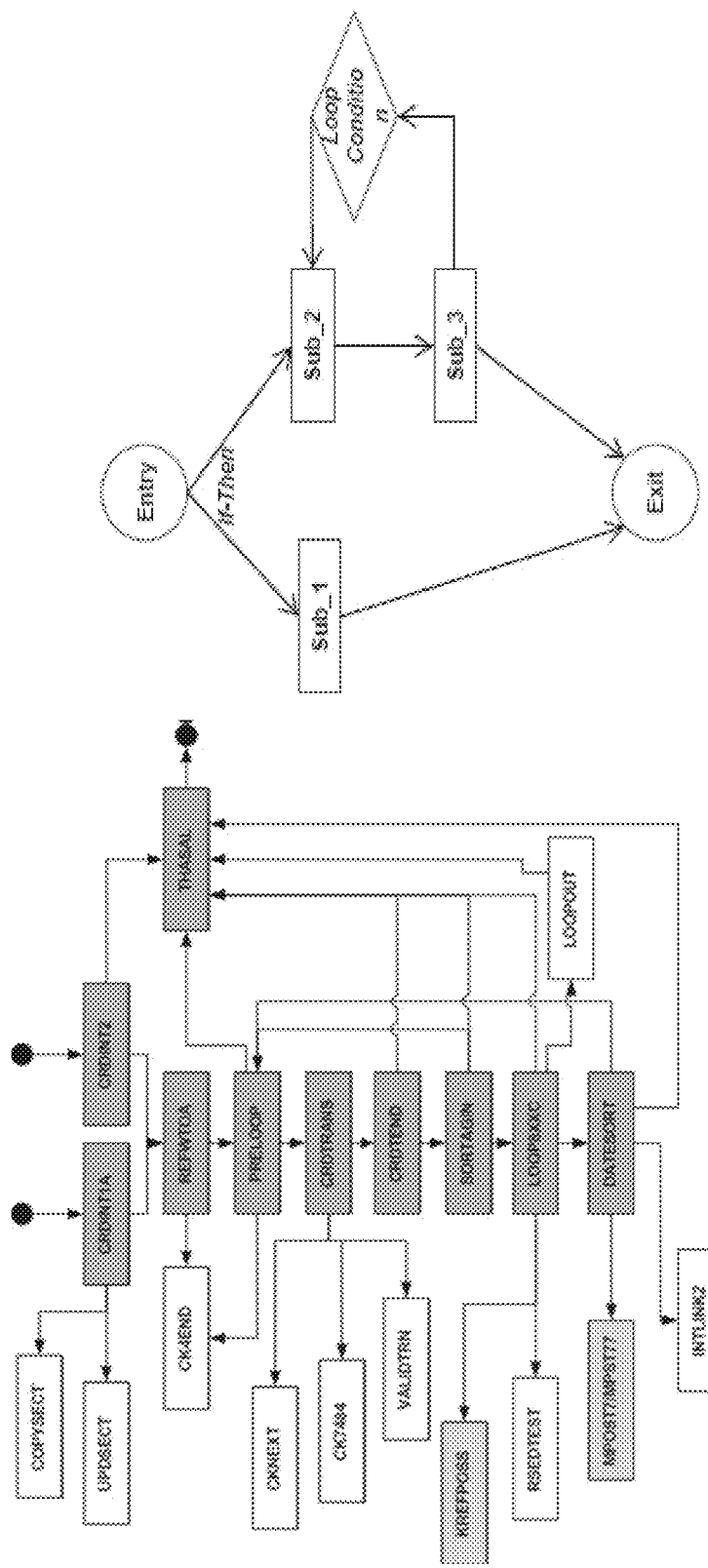
FIG. 1 is a comparison of ALC and object oriented control flow structures.

As used herein, the term "ANTLR" or "ANother Tool for Language Recognition" is a program known in the art for reading, processing, executing and translating structured text or binary file subject to rules, referred to as grammar.

As used herein, the term "Assembler Language Code (ALC)" means a low-level programming language for a computer, or other programmable device, in which there is a very strong (generally one-to-one) correspondence between the language and the architecture's machine code instructions. Each assembly language is specific to a particular computer architecture.

As used herein, the term "Analyzer Tool" means a set of functions to analyze a run of ALC and provide information about the code including but not limited to subroutines, self-modified code, and certain patterns.

As used herein, the term "block" or "run" means a section of ALC which has been isolated for processing, which may or may not be functionally related in some manner.

As used herein, the term "Configuration Files" means files containing ALC; in various embodiments, Configuration Files may include Analyzer Tool and SME inputs.

As used herein, the term "Control Flow Graph (CFG)" means a graphical representation of how instructions or function calls of an imperative program are executed or evaluated.

As used herein, the term "CSECT" means is a separate, relocatable block of code and/or data. Subroutines may be separately compiled into CSECTs. A symbol may address the beginning of a CSECT.

As used herein, the term "Data Extraction Tool" means one or more functions which parse and scan the source ALC for lines of code that contain schema information about how data variables are defined and how the data is stored in physical memory.

As used herein, the term "data" includes data values and schema.

As used herein, the term "DSECT" means a section of code which describes the layout of an area of storage without reserving virtual storage for the area that is described. A DSECT layout may reference any area of storage which is addressable by the program. Symbolic names in the DSECT can be used to extract data from the underlying storage area.

As used herein, the term "dump" or "memory dump" means a set of data used for analysis and/or verification, a process in which the contents of memory are displayed and stored.

As used herein, the term "Individual Master File (IMF)" means an ALC application that receives data from multiple sources.

As used herein, the term "Java Data Objects" means objects generated by the Data Extraction Tool which contain data necessary in a runtime environment.

As used herein, the term "Java Object Model (JOM)" refers to an object which contains extracted data structure definitions that can be directly traced back to ALC or another legacy program.

As used herein, the term "Java Runtime Environment" means a software package that contains what is required to run a Java program.

As used herein, the term "legacy language" means ALC or any language specific to a particular operating system which must be translated to an object-oriented programming language or another target language.

As used herein, the term "normalizing" means any process of conforming schema and logic within a programming language to any rule or standard, e.g., in furtherance of translation from one language to another.

As used herein, the term "rule(s) engine" means software to infer consequences or perform functions based on conditions or facts. There are also examples of probabilistic rule engines, including Pei Wang's non-axiomatic reasoning system, and probabilistic logic networks.

As used herein, the term "schema" means a description of the attributes and location of data.

As used herein, the term "self-modifying code" (SMC) means code that alters its own instructions while it is executing, in which the self-modification is intentional.

As used herein, the term "sequential file format" means a set of logical sequential instructions.

As used herein, the term "SME" or "subject matter expert" means humans with training to perform verification and analysis, or to modify a computer program.

As used herein, the term "target language" means a language to which legacy code is translated.

As used herein, the term "Technical Rule Language (TRL)" means a script/procedure language specially designed to capture ALC constructs and provide a separation between ALC data and program flows, and to provide limited Java functions and class definitions to facilitate translation.

As used herein, the term "Tool" means a group of two or more related functions.

As used herein, the term "Translator Tool" means a group of functions to convert ALC execution logic into TRL using pattern recognition or configuration rules.

As used herein, the term "TRL/Java Engine" means a computer processor for executing Java code.

DETAILED DESCRIPTION OF THE INVENTION

For the purpose of promoting an understanding of the present invention, references are made in the text to exemplary embodiments of System of Method Error Handling for Translation of Assembler Language to Java, only some of which are described herein. It should be understood that no limitations on the scope of the invention are intended by describing these exemplary embodiments. One of ordinary skill in the art will readily appreciate that alternate but functionally equivalent functions, steps, logical conventions or exemplary code coding may be used. The inclusion of additional steps or elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

It should be understood that the drawings, flowcharts, and diagrams are exemplary only and that emphasis has been placed upon illustrating the principles of the invention. Steps may be performed in any order. In addition, in the embodiments depicted herein, like reference numerals in the various drawings refer to identical or near identical structural elements.

FIG. 1 illustrates a comparison of ALC to Java control flow logic.

Figure 2:
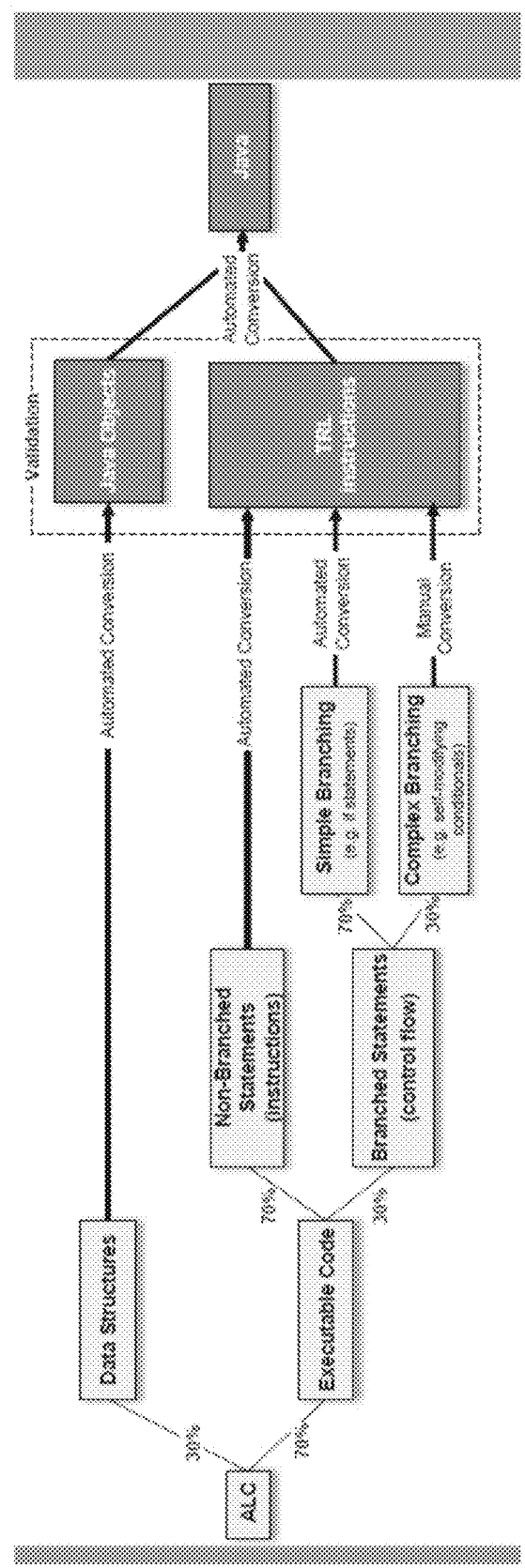
FIG. 2 is a flow chart illustrating an exemplary execution ALC to Java translation process.

FIG. 2 is a flow chart illustrating an exemplary execution ALC to Java translation process.

Figure 3:
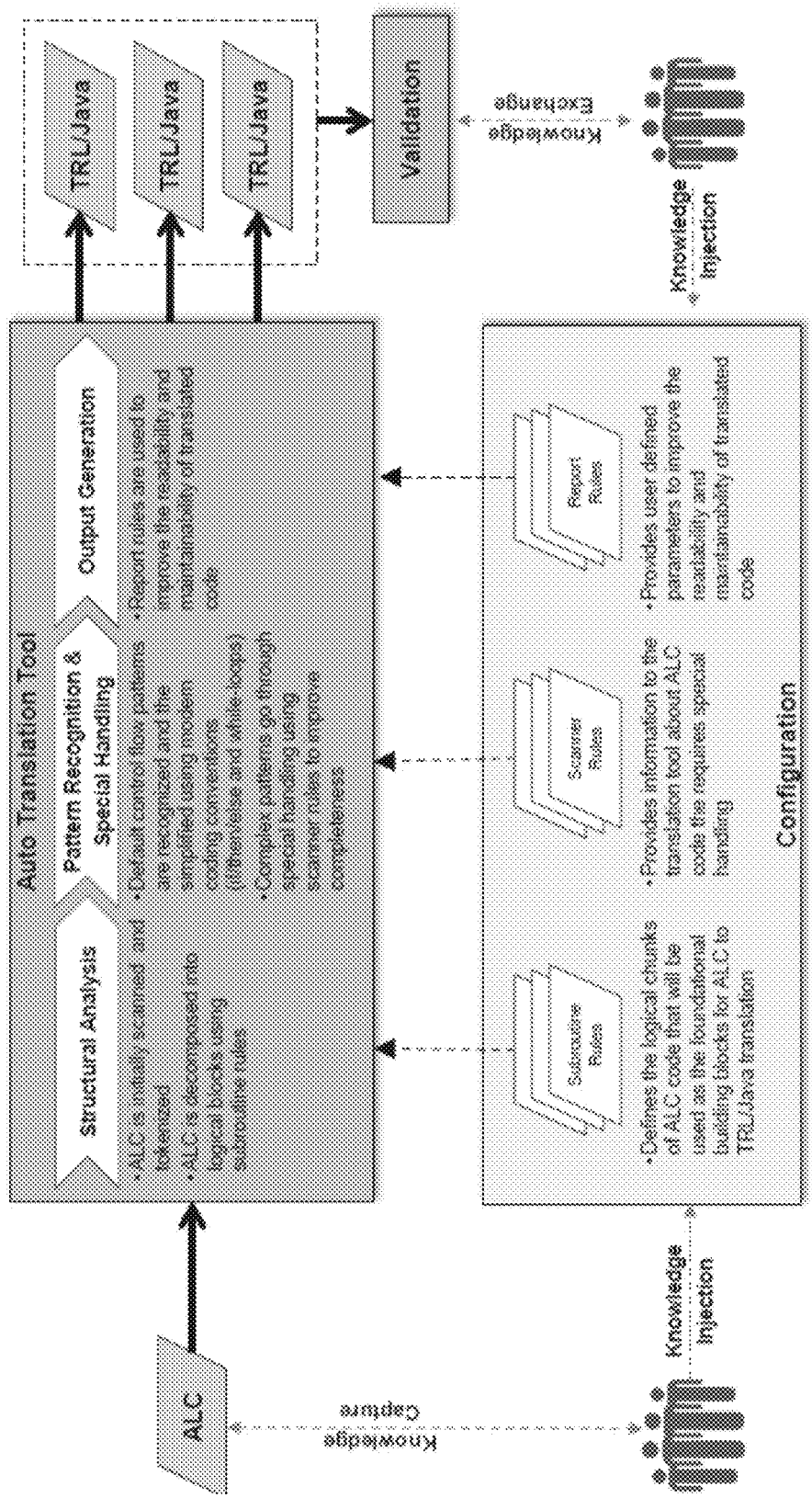
FIG. 3 illustrates one embodiment of multi-layered computer architecture for ALC to Java translation.

FIG. 3 is an exemplary embodiment of an ALC to Java translation system 300. In various embodiments, Java translation system 300 includes a Data Extract Tool that performs functions to build the data model automatically from ALC data elements. This tool can scan the ALC source codes and extract out the data definitions to build the data model automatically. Because the physical layer of the data model in the translated TRL codes have similar attributes to ALC codes, a unique validation approach has been developed that can effectively validate the translated TRL code fragments at any granular level. In this validation approach the memory of the ALC code at runtime, (e.g., on IBM mainframe), is dumped at any selected point and can be compared to that of the translated TRL code at runtime, (e.g., on a Linux server). This approach allows for any selected fragment of the translated TRL codes (e.g., a module or a subroutine) to be validated against the ALC version of the same code.

Figure 4:
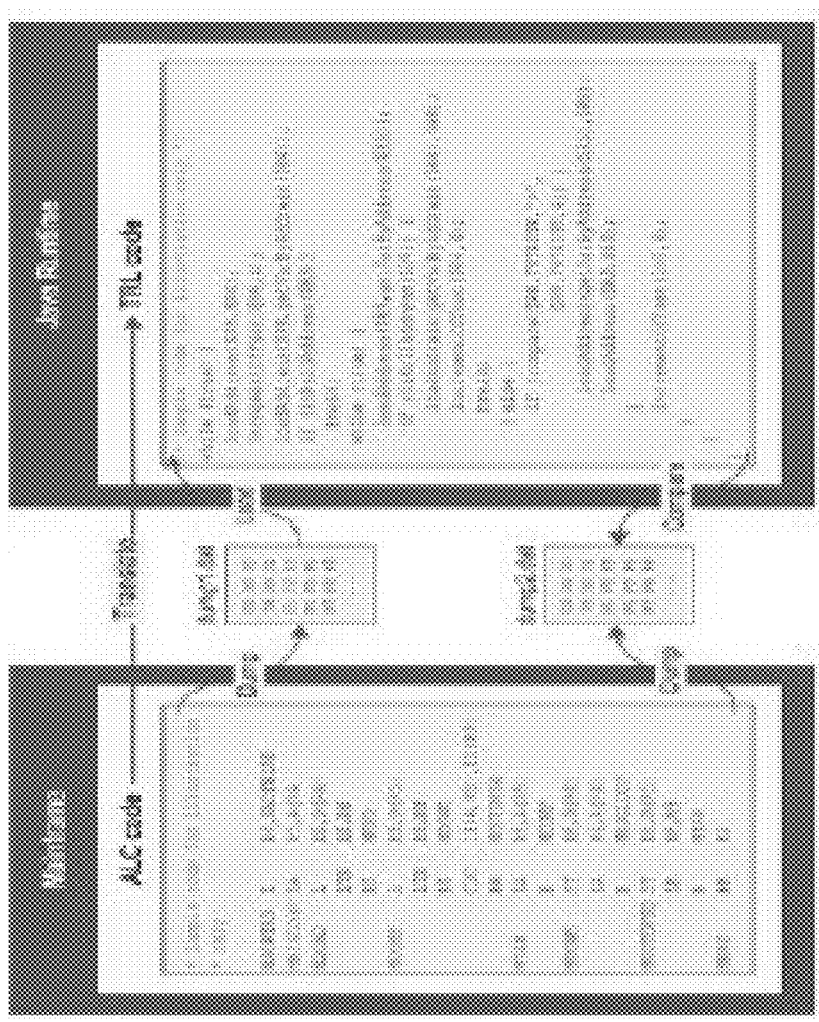
FIG. 4 illustrates an exemplary test of an ALC to TRL conversion using a data dump process.

FIG. 4 illustrates an exemplary test of an ALC to TRL conversion using a data dump process.

Figure 5:
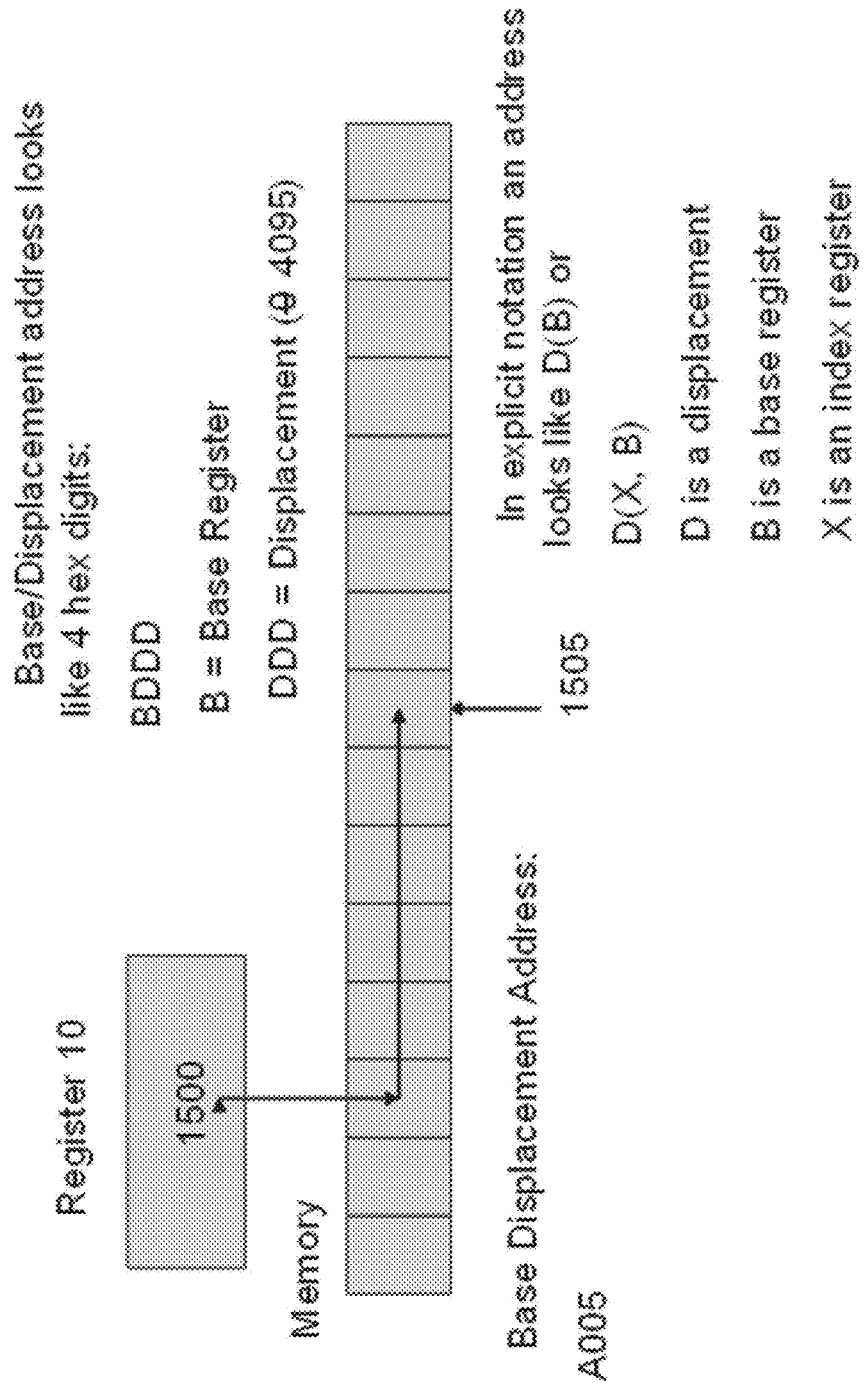
FIG. 5 is a base/displacement addressing scheme in ALC and TRL.

FIG. 5 is a base/displacement addressing scheme in ALC and TRL. ALC uses in-memory data representation exclusively, and therefore all variables are global.

A CSECT listing is associated to one storage block with a start position of 0 and a certain length, as obtained from extraction. The Gate values are reset in various CSECTs. Business logic for any given transaction is scattered among those CSECTs.

Each data item within a CSECT has an offset property to represent its address, which is defined in the ALC listing and laid out in the storage block b, so is the instruction. The value of a data item is the number of bytes given at that offset in the storage. DSECT data represented as DataSet object is accessed using a base register which contains the address (offset) of the start of the block of data. All general purpose registers are modeled as Register. If the base register is modified, then the same symbolic data name will refer to a different memory location.

Registers are used extensively in assembler programs for intermediate data, pointers, return addresses and so on. The register is modeled in TRL engine as a Register as shown in the figure. The property of regNumber indicates all possible general purpose registers: 0, 1, 2, 3, and 15. The regValue property holds the run time value held by a given register. As previously stated, register value could represent an indirect address as a pointer pointing to another memory block in the storage. The TRL engine handles this indirect addressing mechanism through a specifically defined function notation such as getAddressByBDDD( ) in the ALC to TRL translation. The indirect addressing is associated with certain ALC instructions such as LA or L, etc. The ALC2Java tool distinguishes these commands from others and translates them into getAddressByBDDD( ). The TRL engine provides the corresponding Java class implementation, which allows finding the target memory address. Indirect address can also be associated with a DataItem, which is not a register.

The address handling in TRL is the same as that used in ALC, which is based/displacement. The memory is organized as a sequential collection of bytes. The smallest address would be represented by 0 and the largest address would be represented by the end location of CSECT.

To move the instruction, the translated TRL identifies a field by the address offset obtained from extraction tool. The extraction tool used of the first byte in the field as ALC does and converts any symbols to the corresponding address in base/displacement format. Address in this form consists of hexadecimal digits or two bytes, BDDD, where B represents a base register and DDD represents a displacement. The smallest displacement is x'000'=0 and the largest displacement is x'FFF'=4095.

A base/displacement address is then converted to a direct address.

The effective address, which is the direct address equivalent to the base/displacement address, is computed by adding the contents of the base register with the specified displacement.

A Java parser that parses ALC IMF data files. This will enable viewing IMF data, editing IMF data, and creating test data, which will then enable us to test the TRL.

Finally a data model is automatically generated from a scan of the ALC, and leverages generic patterns that can be reused to generate Java representations of other legacy code bases.

A Subroutine call is normally implemented as a BAL (branch and link) instruction, which stores the return address in a register and branches to the subroutine entry point. To return from the subroutine, the program branches to the address in the register via BR instruction. The Register object and memory storage design handles subroutine easily by using the TRL engine tool. The value of the register is the offset of the target address, which can be located in the same memory block easily. In terms of a subroutine call between two CSECTs in a different listing file, the value of register will be the relocated offset, that is, the storage for the 2nd CSECT is allocated at the end of position of the 1st memory block. So the start position of the 2nd CSECT storage is the length of the 1st CSECT storage used to locate its address or return position.

The technique of modifying instruction opcodes at runtime is frequently used in mainframe assembler applications. An assembler program has access to all of its memory; it can change the value of instructions as well as data. Where there might be very special reasons (with limited memory and processing capability decades ago) for doing so, the executed TRL program at this point will not match the original assembler listing program. Regardless of the reasons, this technique poses a big challenge of translating legacy assembler application into high level programming language.

FIG. 6 illustrates exemplary self-modifying code in ALC.

FIG. 7 illustrates exemplary data structures for used for translation of self-modifying code.

Many cases of self-modifying code are handled automatically in translation. The relationship between the instructions which modify a given instruction and the target instruction being modified are obtained through extracting the symbol table in listing file (see extraction GateVars.dat), and modeled into high level data structure. The attributes of the data structure is represented in the class diagram shown in FIG. 7.

In the exemplary embodiment shown, the SelfModCode high level data structure is used in the translation to capture all of the self-modifying code instructions. The initial values of its containing attributes are set by the extraction tool.

During runtime of executing the translated TRL and Java, the values are properly set depending on the processing logic.

Figure 8:
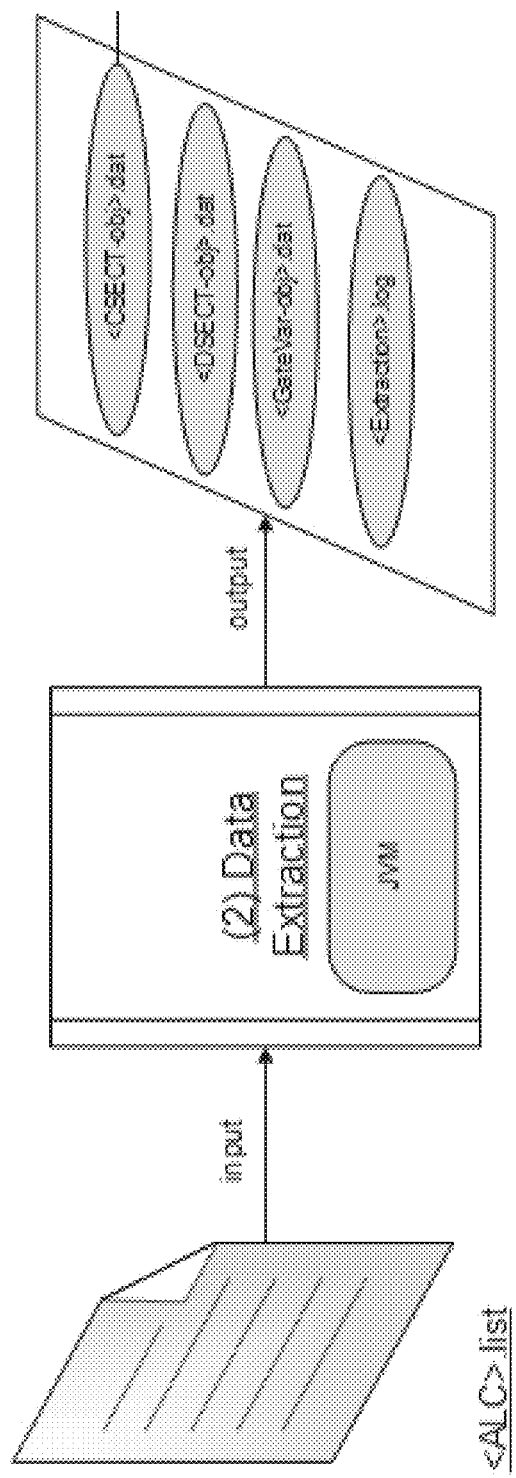
FIG. 8 illustrates an exemplary Data Extraction Tool used to generate JOM data structures.

FIG. 8 is a schematic illustrating an exemplary Data Extraction Tool used to generate JOM data structures. The data extraction tool generates Java Object Model (JOM) data structures.

As illustrated in FIG. 8, an ALC listing is scanned line by line to capture all ALC constructs or data structures into system tables. ALC constructs are subsequently categorized, organized, and stored into extraction expected data structures. These data structures are the predesigned Java classes which are generic enough to abstract ALC data, including type and value, instructions, and flow control variables into object oriented data structures. These data structures subsequently fed into TRL engine or TRL to Java tool to execute the translated TRL or Java programs, and produce the expected outputs the same as the original ALC program does.

The next step is to translate the ALC data elements into object oriented Java data structures. The extraction processes the system table obtained from the scanning process, collects all data declarations such as CSECT, DSECT and gate variables for flow control including self-modified variables, and then transforms them into Java objects.

Figure 9:
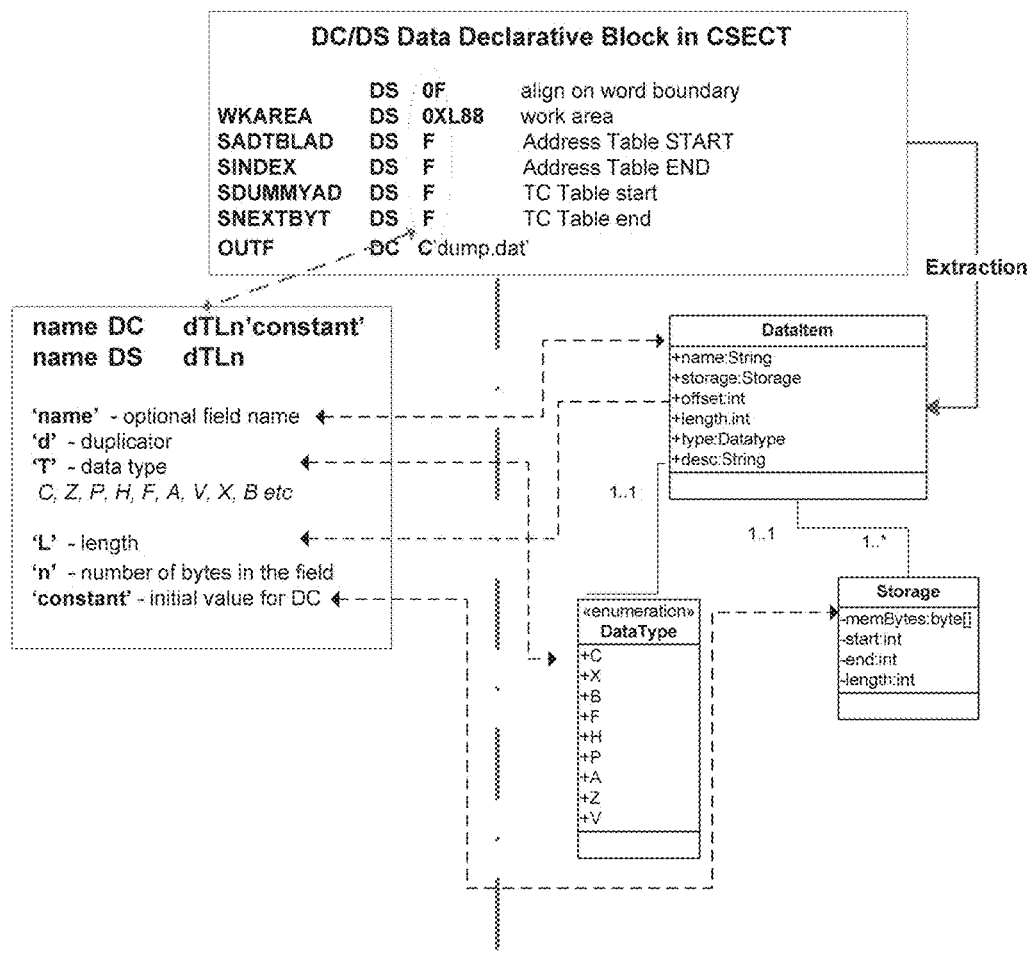
FIG. 9 is an illustration of serialized extraction output.

FIG. 9 is an illustration of serialized extraction output. Java objects are serialized and persisted into <CSECT>.dat, <DSECT>.dat and <GateVars>.dat as the output files. These output data files are the basis for the TRL engine tool and the TRL to Java tool to execute the target TRL programs from ALC2Java and translated Java classes to allow run time verification, respectively.

In the exemplary embodiment shown, the extraction process produces there output data files as serialized Java objects.

The <CSECT>.data object contains the serialized Java object as the representation of CSECT data declaration.

Every data declaration in CSECT, as per the example below, is abstracted into a DataItem Java object, \. DataItem has properties of offset, name, DataType (a Java Enum), corresponding to the offset, label, and ALC type in the listing, respectively. The value of a DataItem is defined as a byte array and stored in Storage object Assembler imposes no restrictions on data types: a four byte quantity can be used interchangeably as an integer, a floating point number, or 32 separate one-bit flags. The Storage object with the underneath byte array allows the target TRL and Java in the translation having a memory layout in the same way as that of the assembler so that the accessing one data element via an offset position from the address of another data element will work correctly. An example of this is supporting the ALC trick of a calculated-and-controlled buffer overrun in order to quickly initialize large data structures or support deep-copies quickly. Pointer addressability and boundary violations are highly illegal in Java and are a Java engineering feat, setting this technology in the category of a unique and "one-of-kind". Furthermore this technology the use of a TRL or Java using the memory dump obtained from ALC program as input, and produce the outputs in the format of will have run time comparisons at the byte level. This ensures that translated TRL or Java produces identical results as that of ALC run.

Figure 10:
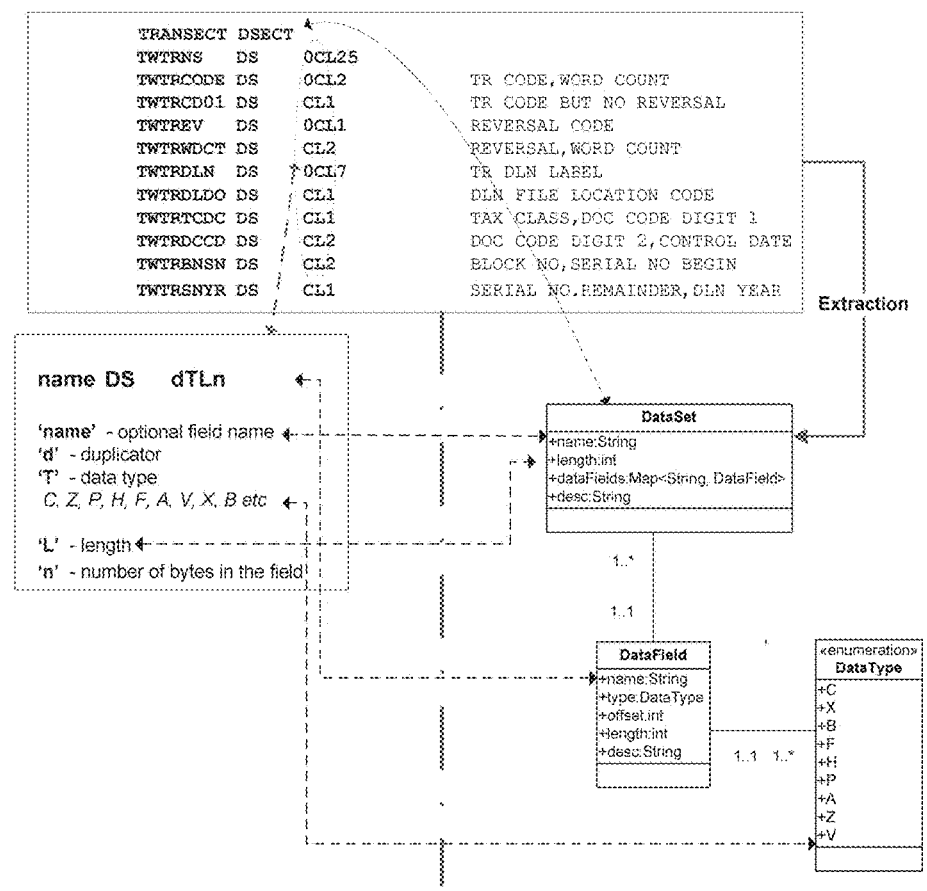
FIG. 10 is an exemplary mapping of extracted Java Objects to an ALC data Declaration.

FIG. 10 is an exemplary mapping of extracted Java Objects to an ALC data Declaration.

The exemplary <GateVars>.dat object file contains the serialized Java object or text format as the representation of gate variables or self-modified variables for flow control. Each of these variable has a Boolean to indicate if a condition is satisfied or not, or an Integer value to describe the results of self-modification. This <GateVars>.dat is obtained from extracting the "Ordinary Symbol and Literal Cross Reference" from a listing file.

FIG. 11 is an exemplary extraction log.

The exemplary <Extraction>.log contains log information of extraction process, which allows reviewing the extraction results in text or XML format. This resulting log data can be easily presented into user friendly web interfaces so that non-developers or SME in ALC may view and verify the extraction results.

Figure 12:
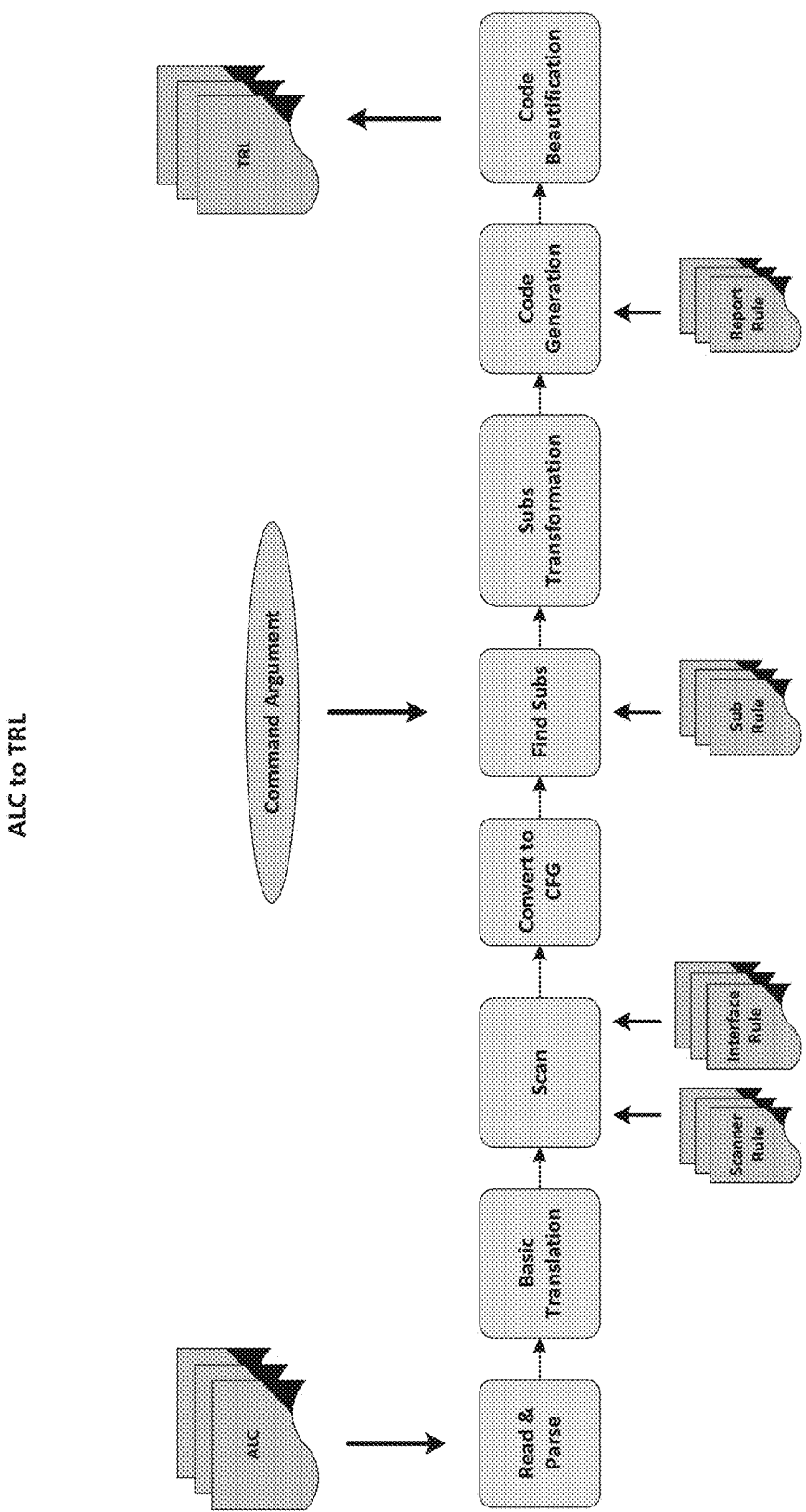
FIG. 12 illustrates an exemplary flow chart of an ALC to TRL processing tool.

FIG. 12 illustrates an exemplary flow chart of an ALC to TRL processing tool.

Figure 13:
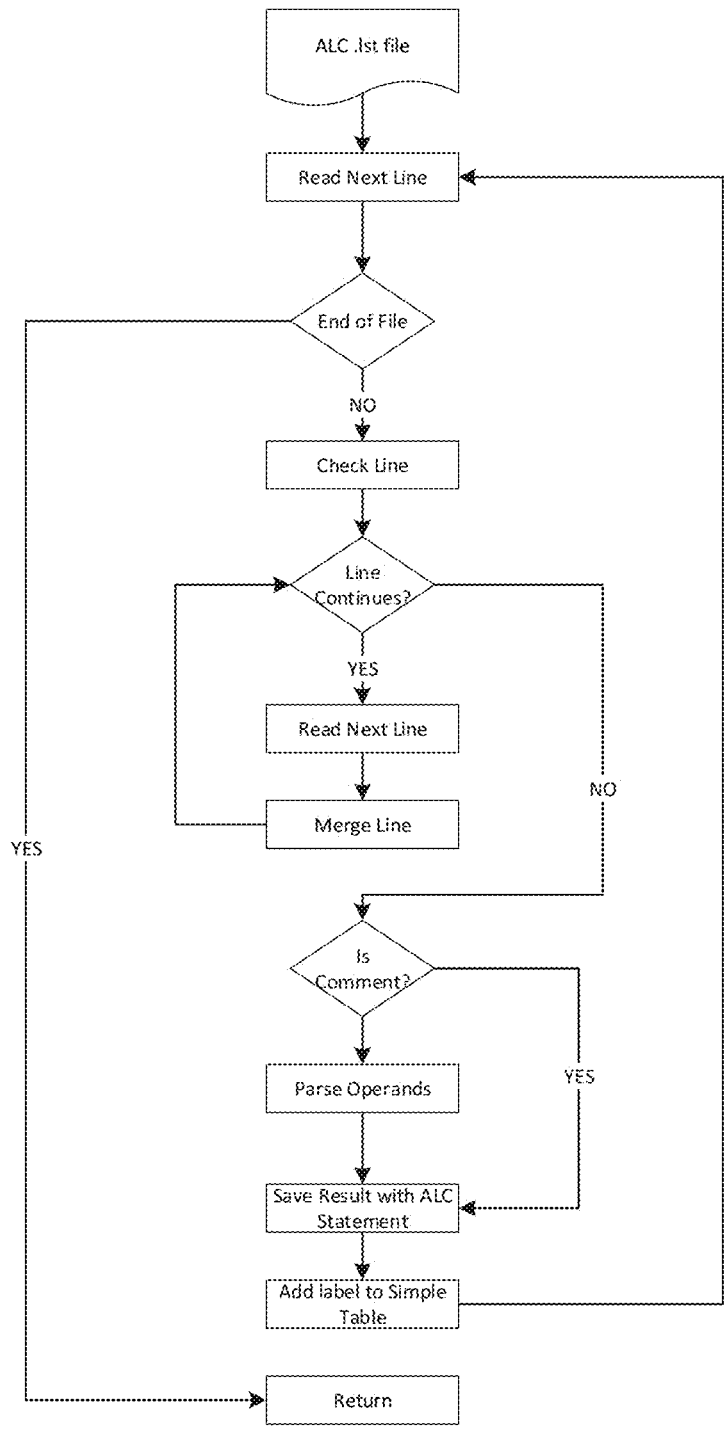
FIG. 13 is a flow chart of an exemplary function for parsing ALC code.

FIG. 13 is a flow chart of an exemplary function for parsing ALC code.

During the processing, a Symbol Table is built based on the labels of the ALC instructions. For each symbol, its attributes (type, references, etc.) are determined.

Figure 14:
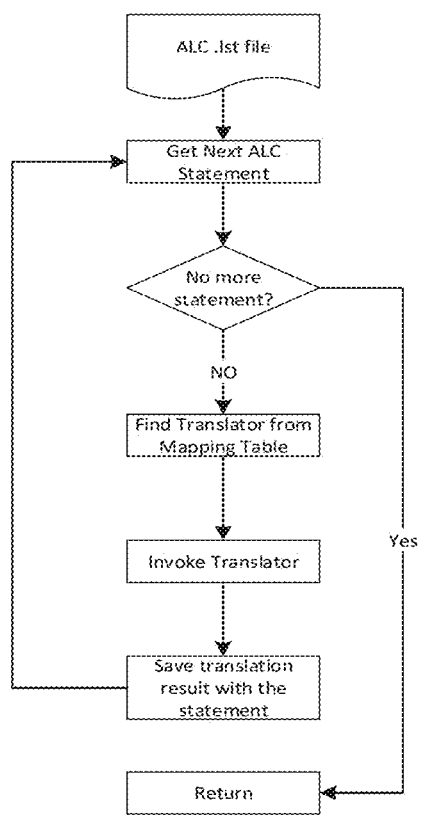
FIG. 14 is a flow chart of an exemplary function translating non-branching ALC instructions.

FIG. 14 is a flow chart of an exemplary function translating non-branching ALC instructions.

Each non-branching ALC instruction has a TRL equivalent function. There are a limited number of ALC syntax formats. The translation is done with a set of syntax-specific translators: each translator is responsible for translating ALC instructions of one syntax format. The system maintains a mapping table that, for each ALC basic instruction, specifies the name of the TRL function and the translator to use. The translation result is saved with the ALC statement.

Figure 15:
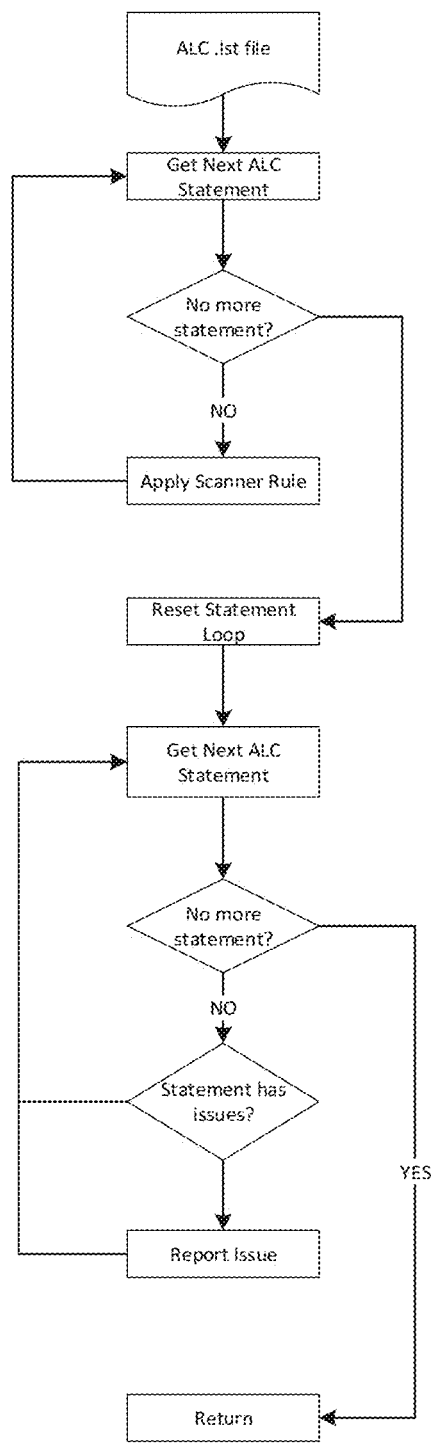
FIG. 15 is a flow chart of an exemplary method for writing scanner rules to override ALC instructions.

FIG. 15 is a flow chart of an exemplary method for writing rules to override ALC instructions.

Scanner rules are implemented with the open-source Drools business rule engine. Scanner rules specify how to fix detected issues.

Scanner rules can also be written to overwrite any original ALC instructions even if the ALC instructions are perfectly normal. This is often used for processing ALC macros, where there is a better implementation in the TRL for the macro.

In this step, the Scanner scans ALC Statements one by one and applies all rules that are applicable to the statements. Then the scanner scans the statements again to detect and report any unresolved issues.

The rules framework allows any rules to be added quickly. A typical rule does one of the following; Treat the statement as an exception; treat the statement as an exit, which causes the program to halt; treat the statement as a branch point with specified condition and destination; overwrite the statement with specified TRL statement; treat the statement as a control transfer point to different modules; treat the statement as a subroutine call; set statement attributes; add comments to the statement.

The translation is an iterative process: the user runs the Scan multiple times and resolve issues incrementally. When the user runs the Scan the first time, no scanner rules are configured because there are no issues to resolve. The Scan detects and reports issues. The user then configures the scanner rules to resolve the issues and run the Scan again. The Scan applies the rules and tries to detect and report remaining issues. This process is repeated until all issues are resolved.

Figure 16:
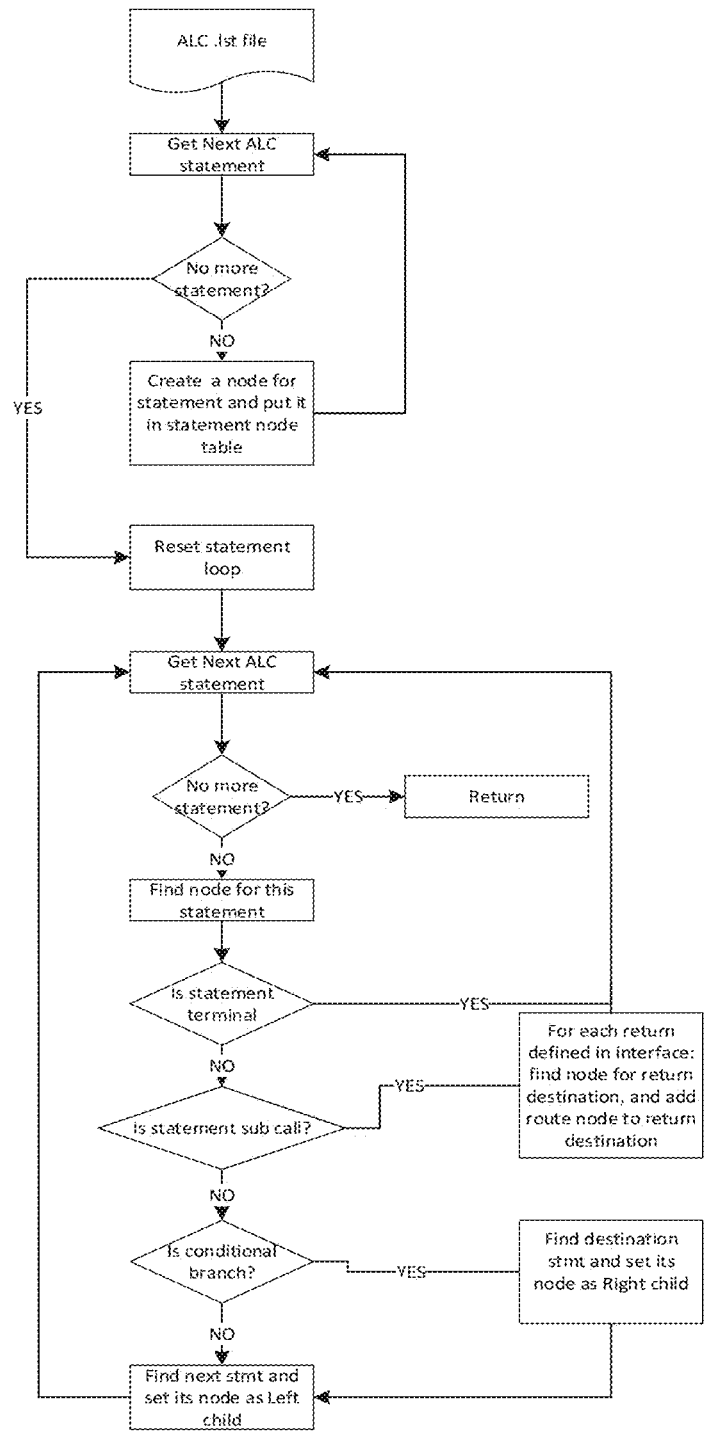
FIG. 16 is a flow chart of an exemplary method for converting the ALC program into a Control Flow Graph (CFG) representation.

FIG. 16 is a flow chart of an exemplary method for converting the ALC program into a Control Flow Graph (CFG) representation.

Figure 17A:
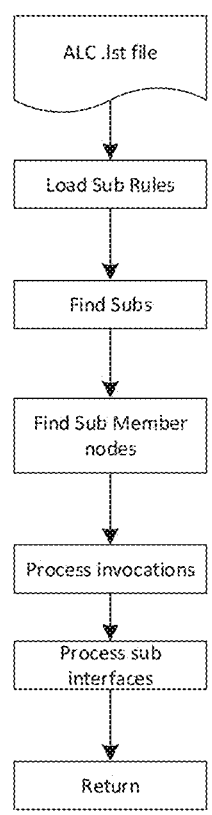
FIGS. 17a and 17b are flow charts of exemplary functions for detecting subroutines for CFG conversion.
Figure 17B:
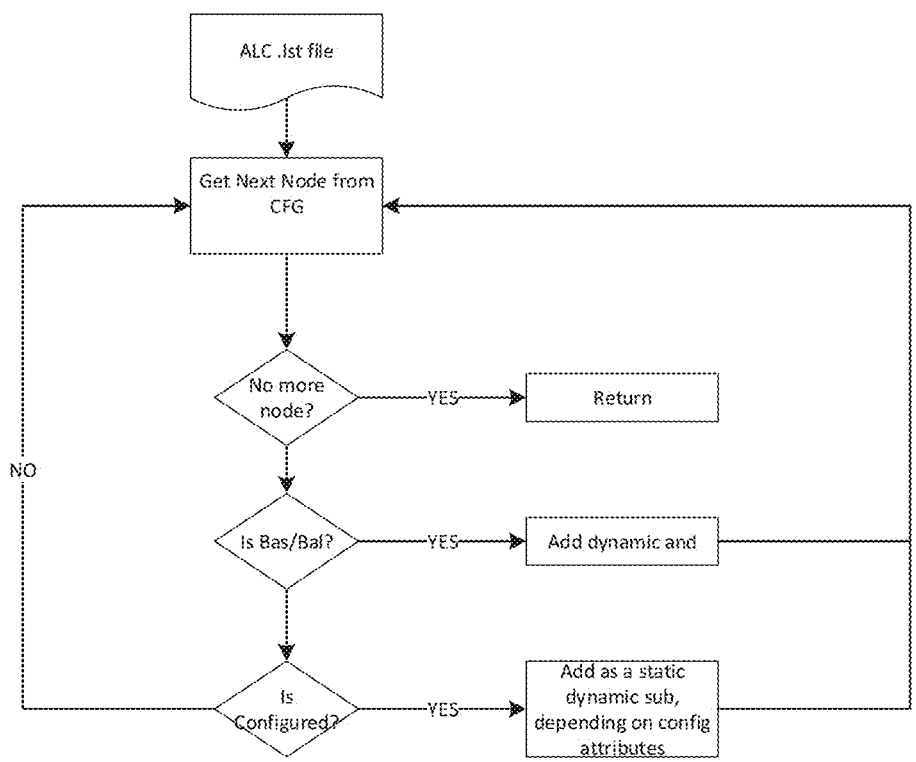

FIGS. 17a and 17b are flow charts of exemplary functions for detecting subroutines for CFG conversion. Such modules are called subprograms or subs in this discussion.

In this step, an ALC run of code has been converted to a CFG representation.

In the exemplary embodiment shown, the CFG is a set of nodes which are connected according to the program's execution flow. Starting from any node, all nodes reachable from the starting node form a sub CFG called island. An island does not connect to any other nodes because all nodes reachable following the CFG links are already included in the island. Exit from the island can only be through nodes of dynamic branch instructions (BR, BxR, etc.).

CFG islands may be treated as subprograms.

Dynamic subroutine use register-based dynamic calling techniques. These functions are "called" from different places and returned to the caller dynamically; static subs are called through static branching instructions.

Many dynamic subroutines s can be detected automatically based on the BAS/BAL instructions. Static subs are manually configured by the user with sub rules (discussed below).

The user can control the invocation relationship between static subroutines s by using layer numbers. A subroutine can only invoke other subs at lower layers. Dynamic subs are callable by all other subs.

In various embodiments, a user can write to add additional sub candidates—either static or dynamic type. Each candidate must have one entrance point. Not all dynamic subs can be detected based on the use of BAS/BAL instructions. This is because there may still be dynamic subs that are called by other ALC programs and not called by the program that contains the subs. Such subs have to be identified by the user.

In other embodiments, a user can write Sub Rules configure the exits of any sub. This practically alters the boundary of the sub island.

In other embodiments, a user can write Sub Rules to set the layer numbers of subs; set the output name of the sub; add comments to subs; set sub processing parameters that can change the behavior of the sub transformation process (more details further down).

In various embodiments, a Sub Finder detects subroutines based on analysis on CFG islands and the user-provided configurations. The Sub Finder detects dynamic subs based on BAS/BAL calls which identify the entrance nodes of the subs Once the Sub Finder has fully executed its functions, the ALC program is divided into multiple subs. Each sub has its own set of member nodes as a sub CFG.

In various embodiments, the same node may d be included in multiple subs. This is perfectly normal when subs share the same set of logic.

Figure 18:
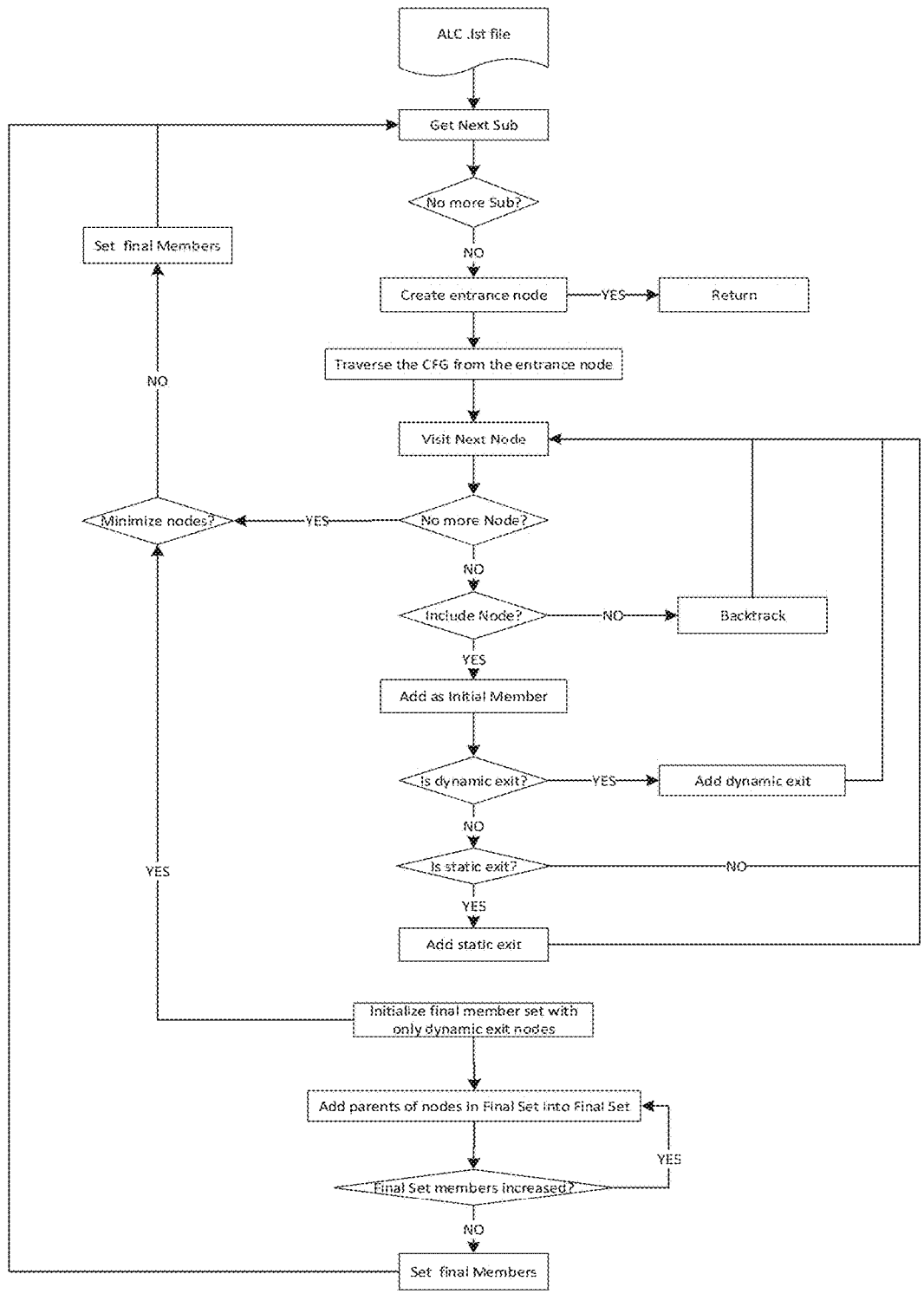
FIG. 18 illustrates a flow chart of an exemplary function for determining sub-member nodes.

FIG. 18 illustrates a flow chart of an exemplary function for determining submember nodes.

For each sub, the Sub Member Finder tries to determine the member nodes that should be included into the sub.

Initially, all nodes reachable find the entrance node of the sub are included.

Dynamic subs normally return through that register that the sub is called with. Nodes corresponding to such returns are included as members of the sub.

For a dynamic sub, its CFG island could contain branches that do not reach any dynamic return points. There are two strategies for member set determination for dynamic subs: minimized, and maximized. With minimized strategy, the sub will only contain nodes that lead to dynamic return points and exclude branches that do not reach dynamic return points. With maximized strategy, all nodes within the island are kept.

Figure 19:
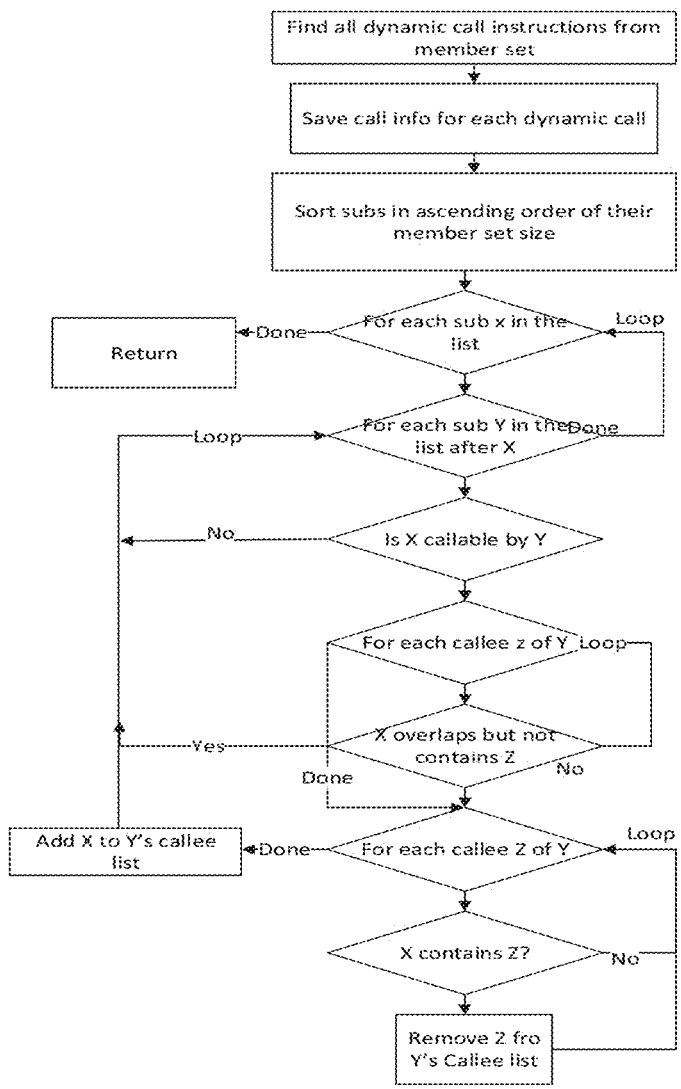
FIG. 19 illustrates a flow chart of an exemplary function for determining return-destination information of a subroutine.

FIG. 19 illustrates a flow chart of an exemplary function for determining return-destination information of a subroutine.

A sub interface specifies the call information and return destination information of the sub.

In the exemplary embodiment shown, the sub has: one or more entrance points, 0 or more static return destinations, 0 or more dynamic return destinations (register-based)

A static sub is called without a register; whereas a dynamic sub is called with a register.

The determination of accurate return destinations is based on a process that uses a strategy based on inheritance: the caller inherits returns from calls that cannot be handled internally.

When a sub X calls sub Y, X must be prepared to process returns from Y It first tries to compute the address of the ALC statement based on the call info and return info. It then tries to determine the destination node corresponding to the address. If the destination node cannot be found from the CFG, then it is an error in the ALC code. Sometimes the ALC programmer intentionally planted such error to cause the program to halt. If the destination node is a member X, then control flow s routed to that node in X. In this case, X can handle the return internally. However, if the destination node is not X, then that return from Y must be treated as a return from X as well—X inherits the return from Y.

This process is done for each sub repeatedly until all sub interfaces become stable.

Figure 20:
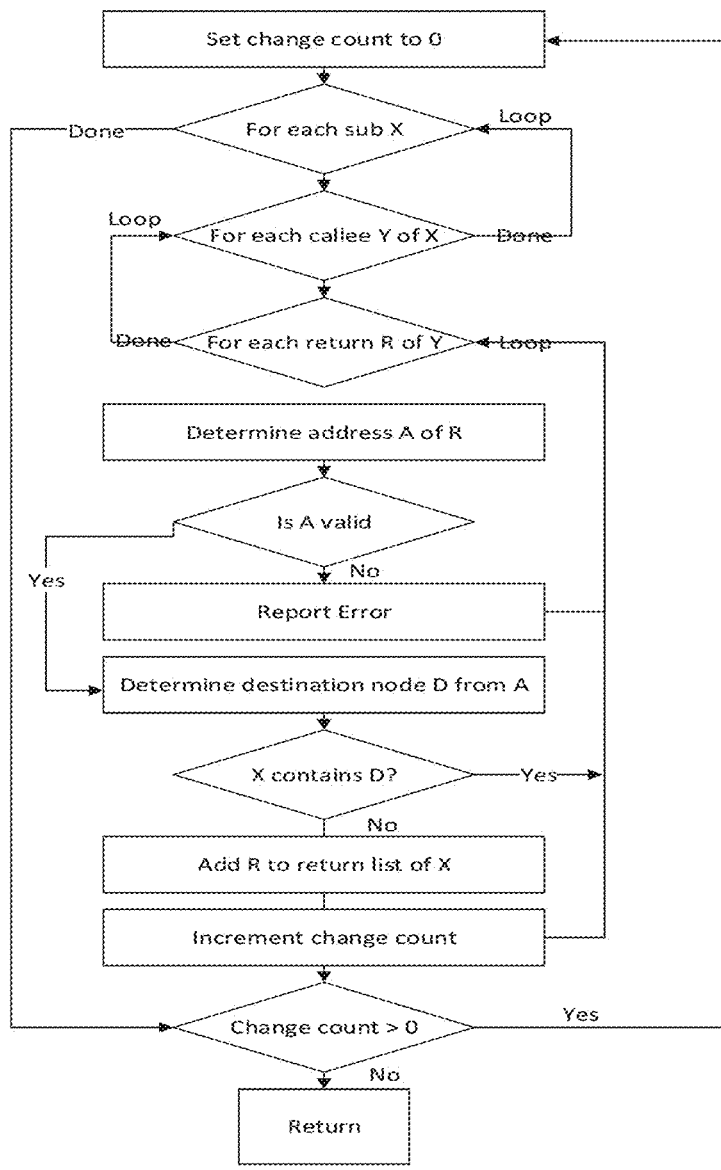
FIG. 20 illustrates a flow chart of an exemplary function for translating ALC subroutines to TRL.

FIG. 20 illustrates a flow chart of an exemplary function determining sub interfaces.

FIGS. 21 through 27 illustrate the transformation of various subroutines to CFG representations.

Figure 28:
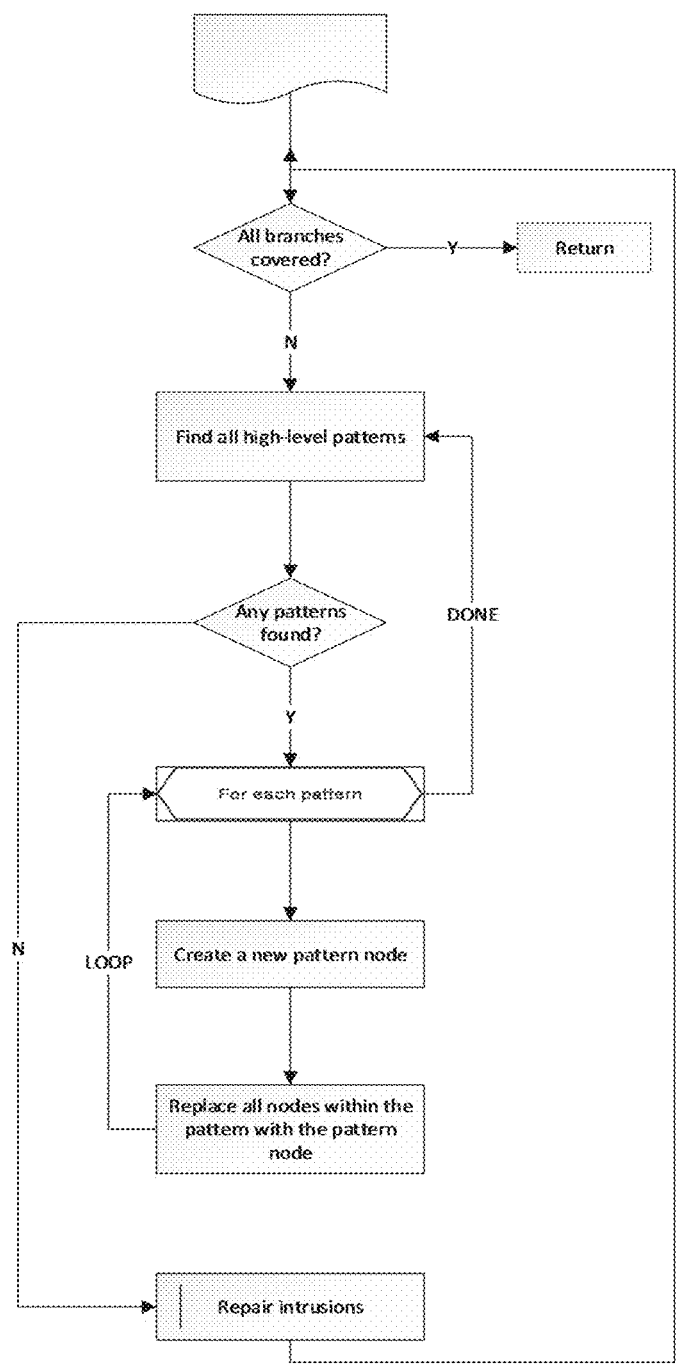
FIG. 28 is a flow chart of an exemplary function for transforming subroutines.

FIG. 28 is a flow chart of an exemplary function for transforming subroutines.

Figure 29:
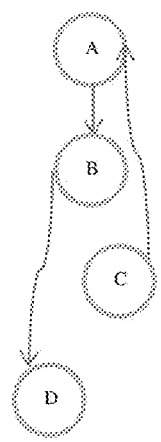
FIG. 29 is a flow chart for a fake loop detection algorithm.

FIG. 29 is a flow chart for a fake loop detection algorithm

FIG. 29 illustrates methods for finding loop candidates only guarantee that all true loops are found, but do not guarantee that all found candidates are true loops.

Figure 30:
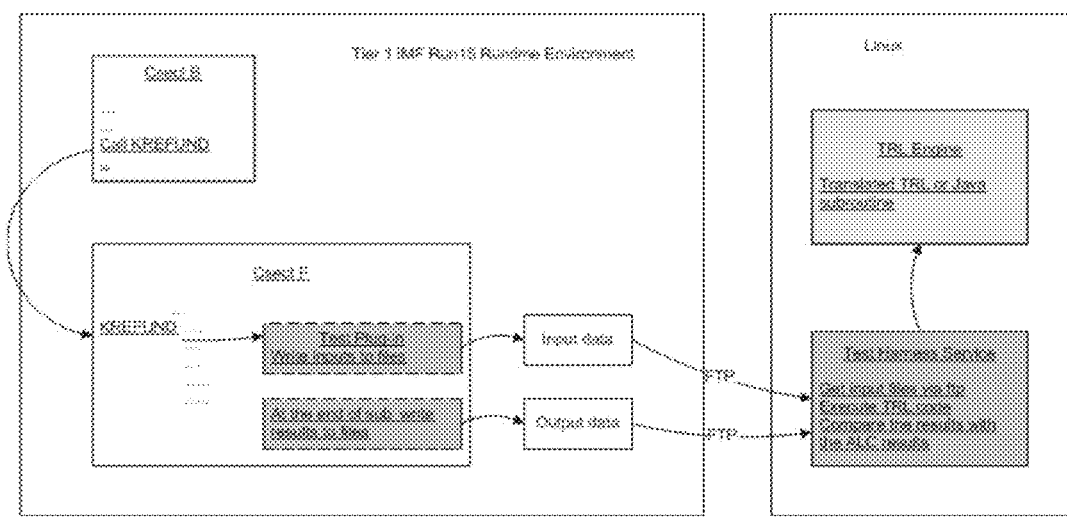
FIG. 30 illustrates an exemplary verification method for translated TRL code.

FIG. 30 illustrates an exemplary verification method for translated TRL code.

The verification method illustrated in FIG. 30 provides a mechanism to compare legacy systems to modernized systems and validate translation at any desired level of granularity (inputs/outputs, CSECTS, sub-routines, chunks, and individual lines of code). For translated code which retain processing of sequential files, recreation of those legacy file formats allows direct comparisons.

Two (2) methods are used for validating the resulting Java translations are the functional equivalent of the Assembler programs The method of using memory dump includes the step of modifying the targeted ALC subroutine to write the input data in memory to file at the beginning of the subroutine and write the results in memory to file at the end of the subroutine.

A "Test Harness Service" loads the input file into the TRL engine and invokes the "translated" TRL subroutine. The results are compared bit-by-bit with the output file dumped from the ALC subroutine A single storage memory model enables a memory dump at any given point of the TRL translation. From the memory dump snapshot taken, data item values and changes can be easily examined and validated against what is expected.

The dump file obtained from a running ALC program is used as the input of the translated TRL program. Another dump is taken at the selected point of ALC program, which is compared with the memory dump of the translated TRL at the same point. This allows comparing the execution results of translated TRL with that of ALC at the byte level, which is another feature provided by tool.

Execution Path Comparison process tracks the execution path of both the original ALC and the generated TRL programs for comparison. This enables the same input files to be passed to the legacy IMF ALC as well as the TRL equivalent, and then validate that the execution path matches line for line.

The execution path for both the original ALC code and the translated TRL is written out during runtime, then compared Data is generated for multiple test cases to validate critical run paths to make sure translated code executes the same way the original code does FIG. 31 illustrates an exemplary memory dump file organization.

A snapshot of a sample of a running ALC program is shown in FIG. 31: A memory hex dump of ALC program. The leftmost column gives the memory address (or offset from wherever the dump started). The number of bytes shown per row is 16 bytes and every 4 bytes is shown in a group separated by space. The byte content is represented in HEX.

The dump file content is organized into three portions as follows:

The content of the 16 general purpose registers appears in the top (in red) of dump file. Each register holds a value or an address which points to somewhere of instruction/data or dynamic memory blocks.

The middle portion (in blue) of the dump file is from instruction and data. This corresponds to the entire storage area of a CSECT. Each byte location is subject to changes depending on the running instructions.

The bottom part (in dark) of the dump represents a dynamic memory block allocated from running the translated TRL program. A sample dynamic memory could be from opening a file corresponding to opening DCB etc., which needs a block of memory to be allocated.

Figure 32:
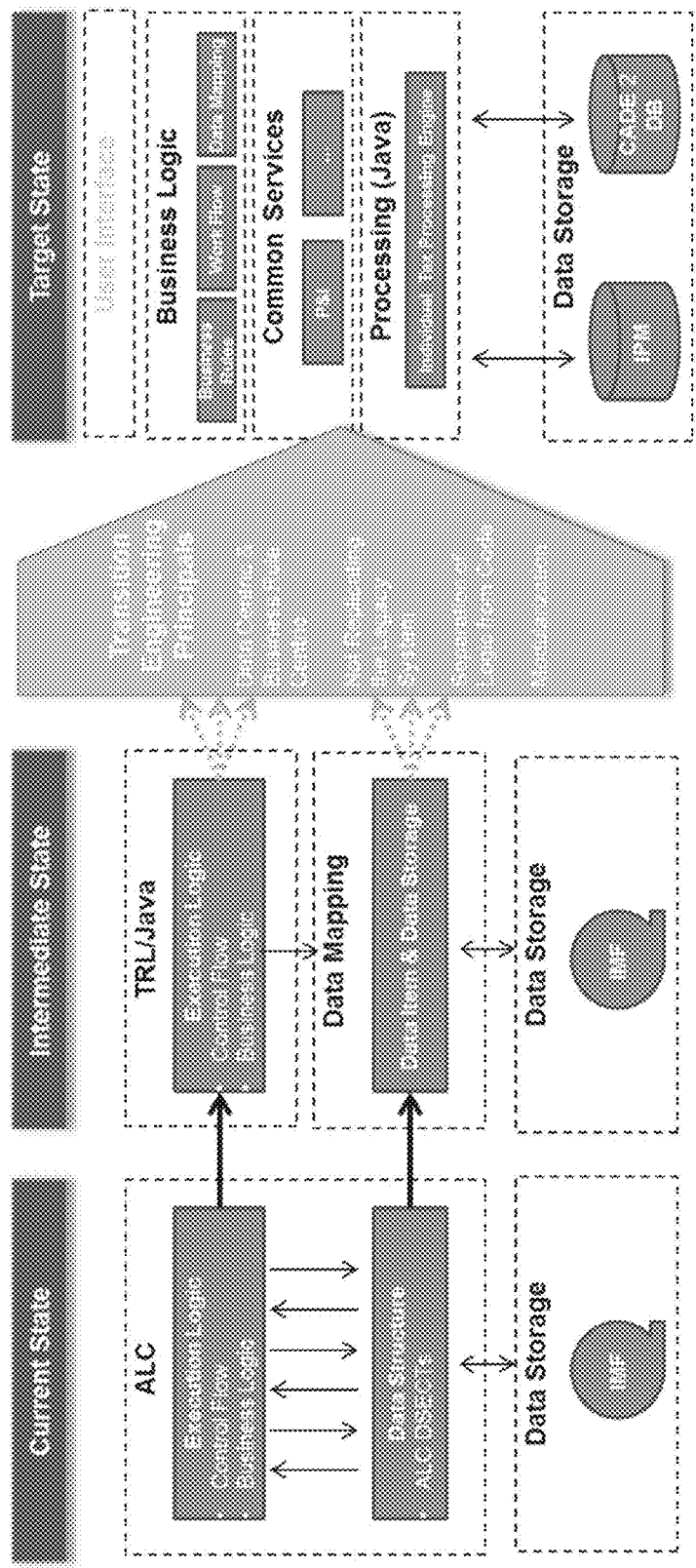
FIG. 32 illustrates an exemplary five-layer software architecture.

FIG. 32 illustrates an exemplary five-layer software architecture.

Refinements of the processing logic code will further separate the business rules from the common processing and align to the five-layer software architecture model of the target state. This layered architecture is fundamental to the IRS's target state vision of IT.

What is claimed is:

1. A computer system configured as layered data model apparatus comprised of:
   a plurality of ALC data structures including CSECT and DSECT data structures, wherein each of said CSECT files and each of said plurality of DSECT files is accessed through a register having based/displacement address handling; and
   a TRL engine which includes a plurality of TRL registers having based/displacement address handling.

2. The layered data model apparatus of claim 1, wherein said layered data model further includes a TRL engine which computes an effective address for ALC to TRL translation functions.

3. The layered data model apparatus of claim 2, wherein said layered data model further includes a TRL engine which handles indirect addresses.

4. The layered model apparatus of claim 3, wherein said indirect address may be associated with a Data Item, which is not a register.

5. The layered data model apparatus of claim 1 wherein said layered data model further includes an Extraction Tool which performs functions to scan said run of ALC code to capture ALC constructs in extraction data structures.

6. The layered data model apparatus of claim 1, wherein said extraction data structures are instances of Java classes, wherein said Java classes include functions to extract ALC data and instantiate object oriented data structures.

7. The layered data model apparatus of claim 6, wherein said Java classes abstract ALC data, including type and value, instructions, and flow control variables and translates said data to object oriented data structures.

8. The layered data model apparatus of claim 7 wherein said Extraction Tool translates said elements of said object oriented data structures to at least one Java data structure.

9. The layered data model apparatus of claim 8 which further includes Java objects layer, which are serialized <CSECT>.dat, <DSECT>.dat and <GateVars>.dat as output files.

10. The layered data model apparatus of claim 6, wherein said Extraction Tool uses a computer based language recognition grammar tool which describes ALC syntax.

11. The layered data model apparatus of claim 7 wherein said Extraction tool collects data declarations selected from a group consisting of CSECT, DSECT and gate variables for flow control including self-modified variables, and transforms said data declarations into Java objects.

12. The layered data model apparatus of claim 1 wherein said grammar tool is ANTLR.

13. The layered data model apparatus of claim 1 which further includes at least one object oriented data structure which stores data declarations selected from consisting of CSECT, DSECT and gate variables for flow control including self-modified variables.

14. The layered data model apparatus of claim 1 which further includes a data storage area for storing labels pointing to the same memory address for instructions, wherein said labels pointing to the same memory address can be used interchangeably.

15. The layered data model apparatus of claim of 1, which further includes ALC listing data structures which are input to said Extraction Tool.

16. The layered data model apparatus of claim 1 wherein said ACL listing objects are Java structures for abstracting any legacy mainframe assembler code.

17. The layered data model apparatus of claim 1 which includes a Translator tool which separately translates each of said ALC subprograms into TRL independently.

18. The layered data model apparatus of claim 1 which further includes a plurality of ALC functions, wherein each of said ALC functions has an interface definition.

19. The layered data model apparatus of claim 1 which further includes an Analyzer which generates interface rules to define the actual return points.

20. The layered data model apparatus of claim 1 which further includes a Translator which performs functions to create a Control Flow Graph (CFG) for translating ALC to TRL.

21. The layered data model apparatus of claim 20 wherein said Translator node clusters that represent structured patterns and replaces said node clusters with nodes that represent the detected patterns.

22. The layered data model apparatus of claim 21 wherein said Translator separately translates each of a plurality of sub-programs into TRL.

23. The layered data model apparatus of claim 20 wherein said Translator performs functions to turn imperfect patterns into perfect patterns.

24. The layered data model apparatus of claim 20 wherein said Translator performs functions for detection and elimination of fake loops.

25. The layered data model apparatus of claim 20 wherein said Translator detects ALC code blocks that have business meanings.

26. The layered data model apparatus of claim 1 wherein said Analyzer performs a function to identify self-modifying code and creates a self-modifying code data structure which stores self-modifying code instructions.

27. The layered data model apparatus of claim 1 which further includes configuration rules stored in configuration files.

28. The layered data model apparatus of claim 1, which further includes Java data structures selected from a group consisting of DataItem, Storage, DataType, DataSet and DataField deserialized from data files from a Data Definition-Data extraction tool.

29. The layered data model apparatus of claim 1 which includes TRL files having a public subroutine which is called by the subroutines in other TRL files.

30. The layered data model apparatus of claim 1, which further includes Java class implementations for performing data dumps in the same format of binary byte data file for mainframe ALC run in TRL.

31. The layered data model apparatus of claim 1, which further includes Java class implementations for creating TRL rules to emulate ALC commands.

32. The layered data model apparatus of claim 1, which is a two-layer software architecture.

33. The layered data model apparatus of claim 1, which is a five-layer data architecture.

* * * * *